United States Patent
King et al.

(10) Patent No.: US 6,320,858 B1
(45) Date of Patent: Nov. 20, 2001

(54) ASYNCHRONOUS TRANSFER MODE SWITCH WITH LOGICAL MULTICASTING

(75) Inventors: David R. King; Mark A. Krumpoch, both of Shrewsbury; Scott E. Lane, Milford; W. Douglas Strubeck, Norfolk, all of MA (US)

(73) Assignee: General Dynamics Government Systems Corp., Needhorn, MA (US)

( * ) Notice: Subject to any disclaimer, the term of this patent is extended or adjusted under 35 U.S.C. 154(b) by 0 days.

(21) Appl. No.: 09/082,350

(22) Filed: May 20, 1998

(51) Int. Cl.[7] .................................................. H04L 12/28
(52) U.S. Cl. ............................................. 370/390; 370/399
(58) Field of Search ................................... 370/389, 390, 370/392, 395, 398, 399, 412, 413, 415, 417, 422, 423, 426, 428, 429, 432, 434

(56) References Cited

U.S. PATENT DOCUMENTS

| | | | |
|---|---|---|---|
| 5,479,401 | * 12/1995 | Bitz et al. | 370/397 |
| 5,579,480 | * 11/1996 | Cidon et al. | 709/243 |
| 5,689,506 | * 11/1997 | Chiussi et al. | 370/388 |
| 5,793,767 | * 8/1998 | Soda et al. | 370/397 |
| 5,991,297 | * 11/1999 | Palnati et al. | 370/389 |
| 6,034,958 | * 3/2000 | Wicklund | 370/395 |
| 6,044,077 | * 3/2000 | Luijten et al. | 370/392 |
| 6,052,373 | * 4/2000 | Lau | 370/399 |

* cited by examiner

Primary Examiner—Hassan Kizou
Assistant Examiner—Kwang B. Yao
(74) Attorney, Agent, or Firm—Jenner & Block, LLC

(57) ABSTRACT

A method and system for logical multicasting on an Asynchronous Transfer Mode ("ATM") switch. There is a logical replication of cells on the same physical port of the ATM switch. A block of consecutive CIs is used by the controller in the switch to create new cells. The CIs are used to control the flow through the switch and for updating the VPI and VCI. These routing tags are part of the header information and multicast to the same physical port

9 Claims, 3 Drawing Sheets

ASYNCHRONOUS TRANSFER MODE SWITCH WITH LOGICAL MULTICASTING

FIELD OF THE INVENTION

The present invention relates generally to the field of network telecommunications, particularly telecommunications among computers.

BACKGROUND OF THE INVENTION

This invention is concerned with Asynchronous Transfer Mode ("ATM") switches and more particularly is concerned with data bandwidth creation using cell replication within an ATM switch.

Sending cells of digitized information and data to multiple destinations, in activities such as electronic mail, video distribution or teleconferencing, is achieved in an ATM switch by cell replication. ATM cell replication in the prior art is spatial. Spatial multicast is the replication of cells on physically independent ports of the switch. Logical multicast, according to the invention, is the replication of cells on the same physical port of a switch.

It is an object of the present invention to create a cost effective, manageable process for cell replication.

SUMMARY OF THE INVENTION

Briefly, the invention is an implementation of a logical multicast process and apparatus. The process may be performed in the existing or specially designed hardware. The inventive process is carried out using hardware that includes an Asynchronous Transfer Mode ("ATM") switch with input ports for receiving cells. Each cell has a header which includes the address fields Virtual Path Index ("VPI") and Virtual Channel Index ("VCI"). Output ports transmit the cells to their destination. The input ports and output ports are coupled by: a routing fabric, a mechanism for adding a Control Index ("CI") to each header to direct the received cells to their respective output ports, each CI based on the received port as well as the VPI and VCI fields of the corresponding cell; a lookup table; and use of the CI to control flow through the routing fabric and to update the VPI and VCI on the outgoing cells by use of said lookup table. The inventive ATM switch process further comprises the steps of:

Assigning a block of consecutive CIs, starting at the original base address CI of the original cell for creating new cells whereupon each new cell is assembled with individual VPIs and VCIs and is destined for the same physical output port as the original cell; blocking out N consecutive CIs (where N represents the maximum number of newly created cells, or leafs); taking a cell from a queue, for delivery to the physical port, indexing the new VPI/VCI by the CI number; directing CIs to the lookup table which provides a corresponding predetermined Logical Multicast Offset field ("LMO") which defines the offset from the base address of the CI of the next leaf of the logical multicast; a zero value indicative that the connection is not a logical multicast connection or that the CI is the last leaf of a logical multicast connection; and repetitively adding said offset to the base address of the cell to index a second VPI/VCI and a second offset added to the first offset and the sum stored until the LMO offset from the last lookup is equal to zero.

Other objects, features and advantages will be apparent from the following detailed description of preferred embodiments thereof taken in conjunction with the accompanying drawings in which:

DETAILED DESCRIPTION OF PREFERRED EMBODIMENTS

To better understand the present invention, the following information is presented with reference to the above drawings.

Figure 1:
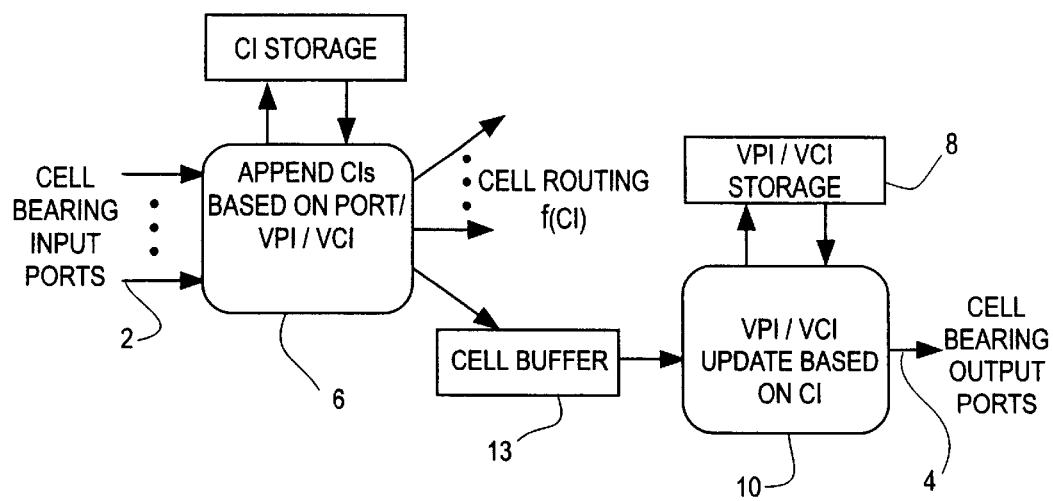
FIG. 1 is a schematic representation of a typical prior art ATM switch.

Referring to FIG. 1, there is seen a typical Asynchronous Transfer Mode ("ATM") switch known in the prior art. The switch has a plurality of input ports 2 for receiving cells of digital data and information and a plurality of output ports 4 for transmitting the cells to their destination. The input ports and output ports are coupled by a routing fabric. The path through the switch is referred to as a connection. A cell arriving at an input port has a header that includes address fields, Virtual Path Index ("VPI") and Virtual Channel Index ("VCI").

Internal routing tags, here called Control Indexes ("CI") 6 are added to the headers of the received cells to direct them to their output ports.

Since ATM cells from different physical ports may have the same VPI and VCI, the CIs indicate the received port as well as the VPI and VCI fields of the received cell. Before the cell is sent out from the output port, the VPI and VCI are updated 8 by the use of a lookup table. The CI is used to control flow 10 through the routing fabric and for updating the VPI and VCI on the outgoing cell.

Figure 2:
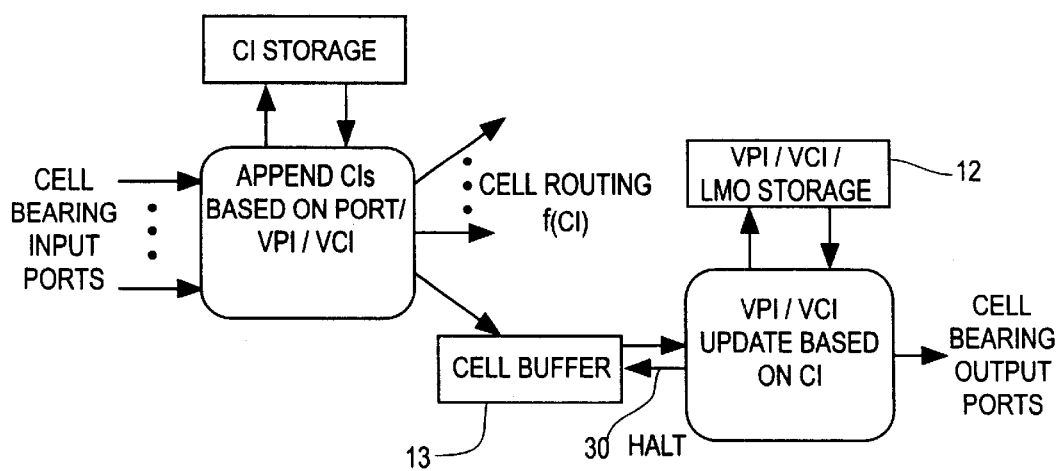
FIG. 2 is a schematic representation of an ATM switch with logical multicasting according to the invention.

A feature of the invention, logical multicasting ("LM"), a form of cell replication on an individual switch port, is performed within an ATM switch as seen in FIG. 2. This feature, combined with the VPI/VCI header updates, creates a cost effective, manageable solution to cell replication.

A block of consecutive CIs, starting at the original index of the cell, is used to create new cells. Each new cell is assembled with individual VPIs and VCIs and is destined for the same physical port. The CIs are assigned in blocks of N consecutive values (where N represents the maximum number of newly created cells, or leafs). When a cell is taken from the buffer for delivery to the physical output port, the CI number is used to index the new VPI/VCI. The CI from the original cell will be referred to as the CI Base Address. As part of the VPI/VCI lookup, an additional field, referred to as Logical Multicast Offset ("LMO") 12, is read.

Figure 3:
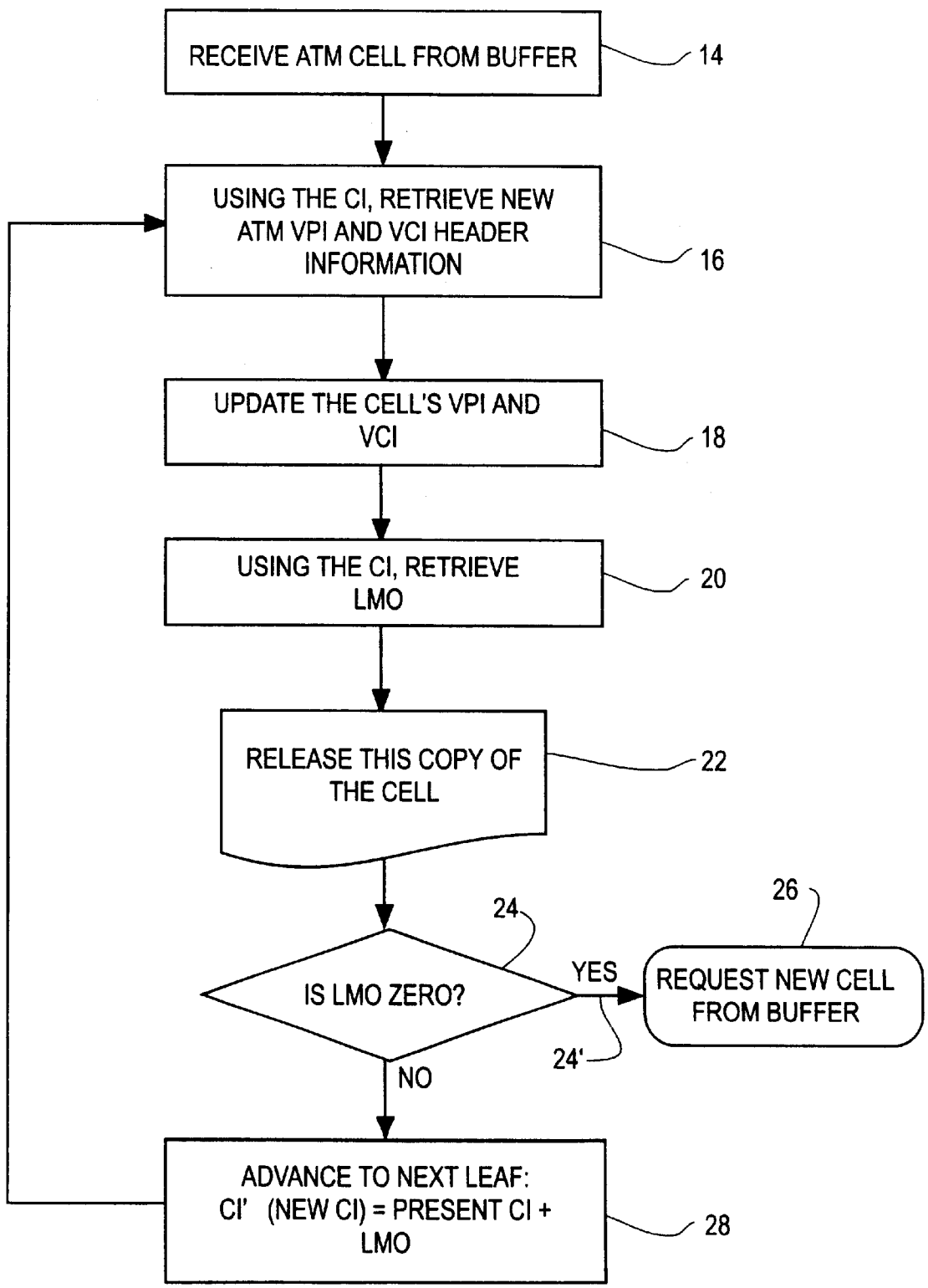
FIG. 3 is a flow diagram of logical multicasting according to the invention.

Referring to the computer based program flow diagram shown in FIG. 3, a new ATM cell is received 14 from the cell buffer 13 (see FIGS. 1 and 2) and the VPI and VCI header information is retrieved 16 and updated 18. The LMO value is retrieved 20 which forms the offset from the Base Address to the CI of the next leaf of the logical multicast. The CI is directed to a lookup table which provides a corresponding offset determined by the CI. Each CI has a predetermined offset. The cell is released 22 or output via an output port. The LMO value is reviewed 24 and a zero value 24' indicates that the connection is not a logical multicast or that the CI is the last leaf of a logical multicast connection that was already sent. If the LMO is not zero the LMO offset value is added to the Base Address 28 to index to the next or second VPI/VCI. The second VPI/VCI information is retrieved and updated 16, 18, and a new LMO is retrieved 20 and the second replication of the cell is released 22. The same process continues with a new offset that is added to the Base Address indexing to a third leaf. This continues until the offset from the last lookup is equal to zero. During the time that the cells are being replicated for the logical multicast, cells from the input ports are held at the cell buffer 13 (see FIGS. 1 and 2) by asserting a halt line (30 of FIG. 2) back to the cell buffer.

Figure 4:
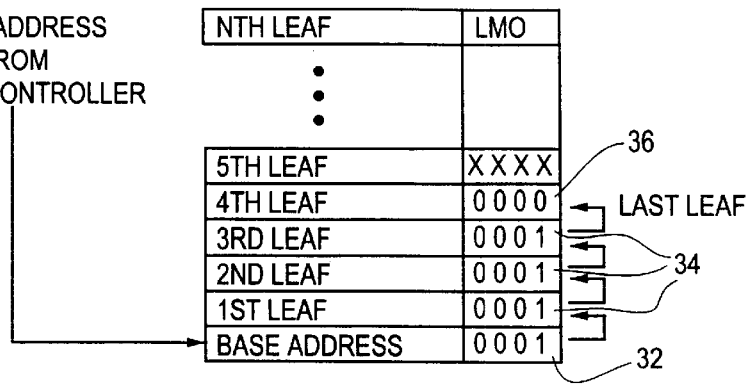
FIG. 4 shows a five-party multicast connection setup according to the invention
Figure 5:
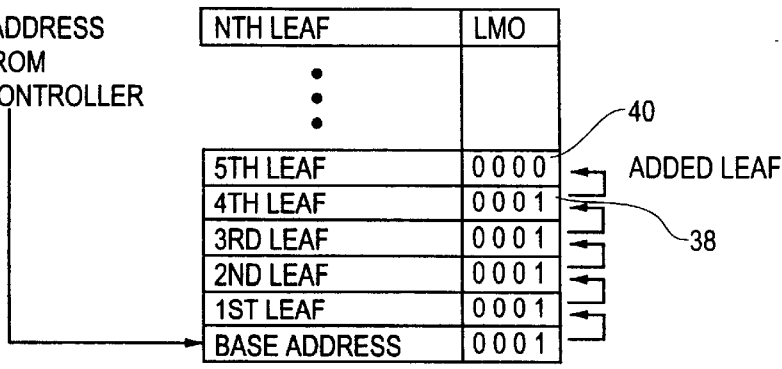
FIG. 5 shows how a leaf may be added according to the invention.

FIGS. 4 and 5 show how to add a leaf to the multicast connection. In FIG. 4 the base address 32 contains in the LMO an offset pointer of one, directing the system to the first leaf 34 for outputting. The first, second, and third leafs all contain this offset pointer value of one. However, when the fourth leaf is output the offset pointer value is zero 36 indicating that the last leaf to be replicated, in this case, is the fourth leaf. The system returns to get a new cell for outputting. FIG. 5 shows the mechanism to add a new leaf. Here the offset pointer of the fourth leaf 38 is updated to contain a one that directs the replication to a fifth leaf 40 for replicating. In this instance the fifth leaf contains the zero thereby ending the replication.

Figure 6:
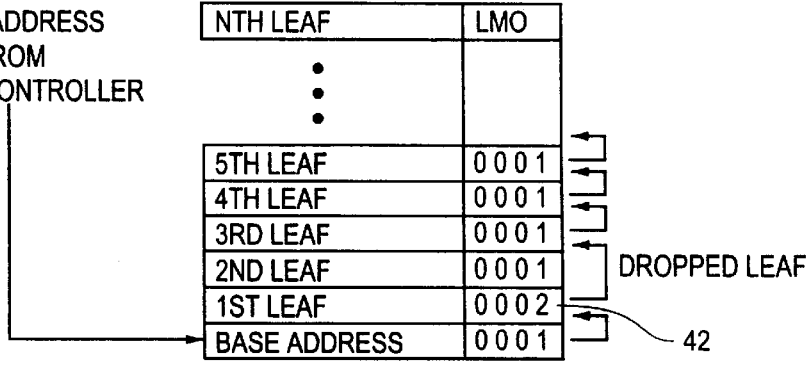
FIG. 6 shows how a leaf may be dropped according to the invention.
Figure 7:
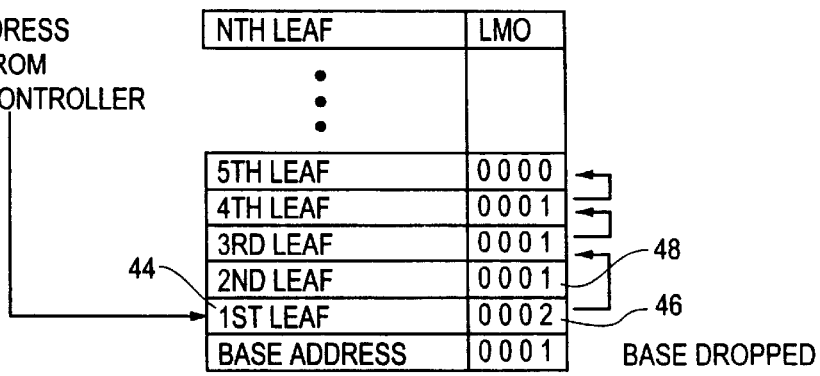
FIG. 7 shows how the base address may be dropped according to the invention.

Similarly, FIGS. 6 and 7 show the capability to drop a leaf from the sequence. In FIG. 6, the contents 42 of the LMO offset pointer for the first leaf is two. This is retrieved and the systems jumps over the second leaf to the third leaf for replication. FIG. 7 shows the capability to drop the Base Address by updating the CI value from that of the original Base Address to that of the next valid leaf. Here the CI value points to the first leaf 44, and the contents of the LMO for the first leaf 46 is two whereupon the system will jump over the second leaf 48 and replicate the third leaf.

As a feature of the design, logical multicast groups can be extended beyond a maximum of N leaves if special attention is paid to the order in which leaves are added or dropped. The logical multicasting process, however, will affect the performance of cells that may be delayed during the cell replication process. It is therefore important that the multicast group be kept small to limit the impact on delay or loss of incoming cells. Additionally, the bandwidth created by the logical multicast must also be considered when connections are set up in the same physical port to minimize delay and loss.

These functions may be implemented with the following routines, as detailed in the program listings in the attached appendix:

VHDL Code titled "Structural code for logical multicasting function"

VHDL Code titled "State machine for logical multicasting"

VHDL Code titled "Stores logical multicasting offset"

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A process for logically multicasting implementing an Asynchronous Transfer Mode ("ATM") switch having a plurality of input ports for receiving cells, each cell with a header including address fields Virtual Path Index ("VPI") and Virtual Channel Index ("VCI") and a plurality of output ports for transmitting the cells, outgoing cells, to their destination, said input ports and output ports coupled by a routing fabric, a mechanism for adding a Control Index ("CI"), including a base address, to each header to direct the received cells to their respective output ports, each CI based on a received port as well as the VPI and VCI fields of a corresponding cell; a lookup table; and use of the CI to control flow through the routing fabric and for updating the VPI and VCI on the outgoing cells by use of said lookup table, said multicasting process further comprising the steps of:

assigning of a block of consecutive CIs, starting at the base address CI of an original received cell for creating leafs whereupon each leaf is assembled with individual VPIs and VCIs and is destined for the same physical output port as the original received cell;

adapting to block out N consecutive CIs, wherein N represents the maximum number of leafs;

taking a received cell for delivery to the physical port, wherein the CI number of the received cell is used to index the VPI/VCI for the leafs;

directing CI to said lookup table which provides a corresponding predetermined Logical Multicast Offset field ("LMO") which defines the offset from the base address of the CI to the next leaf of the logical multicast; a zero value of the offset indicative that a connection is not a logical multicast connection or that the CI is the last leaf of a logical multicast connection; and repetitively adding said offset to the base address of the cell to be replicated to index a next VPI/VCI and a next offset which is added to the repetitively added offset until the LMO offset from the lookup table is equal to zero.

2. The process as defined in claim 1 further comprising the steps of:

determining that a given leaf is not to be processed in the logical multicast by storing an offset value, in the LMO of a prior leaf being output, large enough so that the process skips over that given leaf.

3. The process as defined in claim 1 further comprising the steps of offsetting the base address to a new address so that the original received cell is not processed, and the leaf at the new address is processed first.

4. The process as defined in claim 1 further comprising the steps of:

adding a new leaf to be processed by replacing the zero stored in the LMO with a one, said one indicating the address of the new leaf.

5. The process as defined in claim 4 wherein the new leaf represents a value greater than N.

6. An Asynchronous Transfer Mode ("ATM") switch having a plurality of input ports for receiving cells, each cell with a header including address fields Virtual Path Index ("VPI") and Virtual Channel Index ("VCI") and a plurality of output ports for transmitting a outgoing cells to their destination, said input ports and output ports coupled by a routing fabric, a controller for adding a Control Index ("CI") to each header, including a base address, to direct the received cells to their respective output ports, each CI based on a received port as well as the VPI and VCI fields of a corresponding cell; and a lookup table; wherein said controller is adapted for using the CI to control flow through the routing fabric and for updating the VPI and VCI on the outgoing cells by use of said lookup table;

said controller is adapted for assigning a block of consecutive CIs, starting at the base address CI of an original received cell for creating leafs whereupon each leaf is assembled with individual VPIs and VCIs and is destined for the same physical output port as the original received cell;

said controller is adapted to block out N consecutive CIs, wherein N represents the maximum number of leafs;

said controller is adapted for taking a received cell for delivery to the physical port, wherein the CI number of the received cell is used to index the VPI/VCI for the leafs;

said controller is adapted for directing the CI to the lookup table which provides a corresponding predetermined Logical Multicast Offset field ("LMO") which defines the offset from the base address of the CI of the next leaf of a logical multicast; a zero value indicative that a connection is not a logical multicast connection or that the CI is the last leaf of a logical multicast connection; and said controller is adapted for repetitively adding said offset to the base address of the cell to index a next VPI/VCI and a next offset which is added to the repetitively added offset until the LMO offset from the lookup table is equal to zero.

7. A computer program for logical multicasting information of original cells, said original cells including a header with VPI and VCI fields, on the same physical port of an ATM Switch, said ATM switch including receiving ports and outputting ports, comprising the steps of:

adding a CI, a control index including a base address, to the headers of the original cells, wherein the CI is based on the VPI, the VCI, and a received port, wherein said CI directs a cell to its respective output port, determining the number of times an original cell is to be replicated, creating a number of replicated cells of each original cell, herein defined as leafs, said leafs having VPIs and VCIs, and LMOs defining offsets from said base address, assigning a block of consecutive CIs, wherein the first CI is the base address of the CI of the original cell, and block length being the maximum number of times the cell is to be replicated for said multicasting, and accessing LMO offsets for each leaf until a LMO offset value is zero, wherein the multicasting is complete.

8. The computer program of claim 7 further comprising the steps of:

providing a halt signal that prevents another cell from being accessed until the multicasting of a cell multicasting has been completed.

9. The computer program of claim 7 further comprising the steps of:

modifying LMO offset values for said leafs such that given leafs are skipped over and not processed.

* * * * *